Sept. 29, 1942.  L. T. MILLER  2,297,576
VALVE
Filed Sept. 11, 1940    2 Sheets-Sheet 1
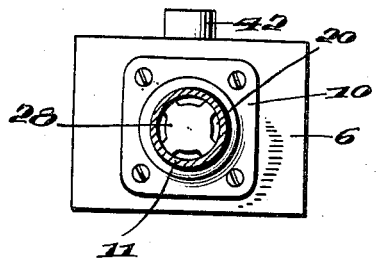
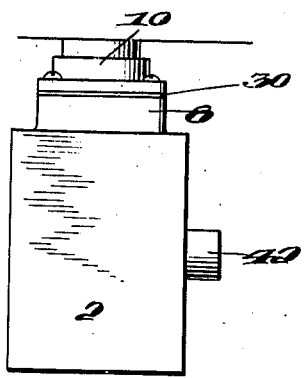
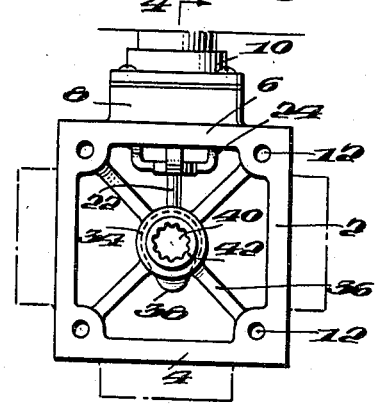
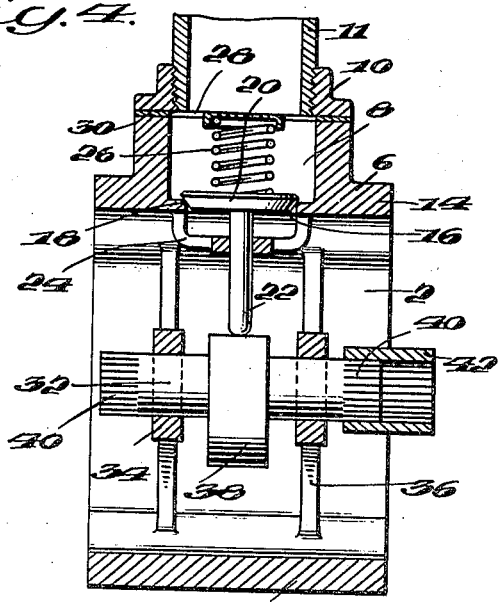
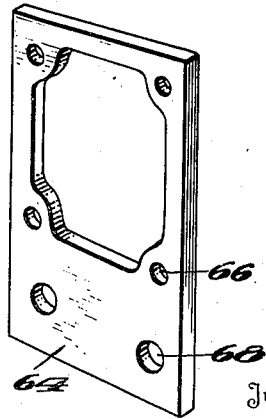
Inventor
LESLIE T. MILLER
By Harrison Bates
Attorney Sept. 29, 1942.  L. T. MILLER  2,297,576
VALVE
Filed Sept. 11, 1940  2 Sheets-Sheet 2
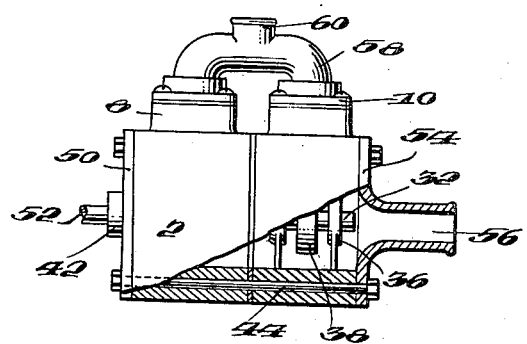
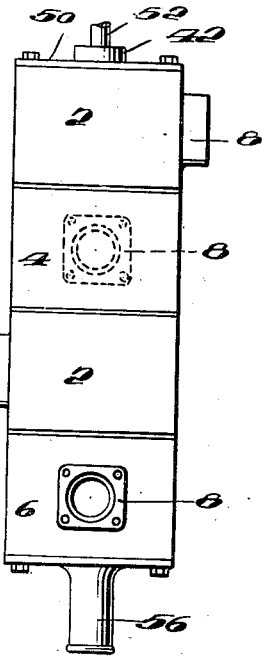
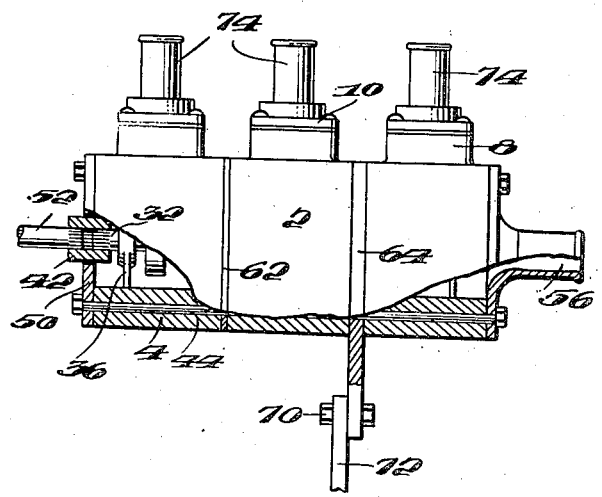
Inventor
LESLIE T. MILLER
By
Attorney Patented Sept. 29, 1942

2,297,576

UNITED STATES PATENT OFFICE 2,297,576

VALVE

Leslie T. Miller, Stoneleigh, Md., assignor to The Glenn L. Martin Company, Baltimore, Md.

Application September 11, 1940, Serial No. 356,285

8 Claims. (Cl. 277—20)

The present invention relates to valves.

The primary object of the invention is to provide a valve unit of such a nature that a plurality of the units can be combined to form any desired valve arrangement.

A further object of the invention is to provide a valve unit, a plurality of which can be assembled together in various relationships.

Still another object of the invention is to provide a valve unit so constructed that a plurality of the units can be assembled together in different relative positions so as to obtain inlet and outlet arrangements in whatever position may be desired.

Still a further object of the invention is to produce a valve unit so constructed that it may be assembled with other valve units in a number of different positions with respect to the other units.

A further object of the invention is to provide a valve unit of such construction that a number of units may be assembled together and controlled by a single control member.

An additional object of the invention is to furnish a valve unit having a valve operating shaft therein which is provided with means on its ends for connection to the operating shafts of adjacent units so that a number of the units, when assembled together, may be controlled simultaneously.

The great advantage of a construction of this type is that it reduces the number of standard parts required for producing a large number of combinations of structures, and permits almost any desired valve arrangement by building up similar units in any desired fashion.

Further objects and advantages of the invention will appear more fully from the following description, particularly when taken in conjunction with the accompanying drawings which form a part thereof.

In the drawings:

Fig. 1 is a top plan view of a valve unit embodying my invention;

Fig. 2 is an end view thereof;

Fig. 3 is a side elevation thereof;

Fig. 4 is a cross section, substantially on the line 4—4 of Fig. 2;

Fig. 5 shows one possible arrangement of a plurality of valves;

Fig. 6 shows another arrangement thereof with mounting means for the valve assembly;

Fig. 7 is a perspective view of a mounting plate for a valve assembly of this type; and Fig. 8 shows still another form of valve assembly.

As shown in the drawings, the valve unit illustrated particularly in Figs. 1 to 4 comprises a rectangular or other suitably shaped open-ended body having a plurality of walls, such as side walls 2, a bottom wall 4 and a top wall 6. In at least one of the walls, for example, in the top wall 6, there is provided a passage 8 with a projecting boss 10 for the connection of piping 11 thereto. While the structure shown is rectangular and is provided with the passage in the top wall, it will be understood that this is only disclosed by way of example and that the shape of the walls and the position of the passage may be varied in any desired fashion.

The casing so formed is open at its ends, as is apparent from Fig. 2. Equally spaced around the periphery of the casing are a plurality of elements of some type for securing together a number of the units. In the form shown, this consists of longitudinally extending passages 12, adapted to receive securing bolts in a manner to be described below.

Within the casing is arranged a valve of any suitable type and operating mechanism for such valve. In the form of the invention shown, there is arranged within the casing and on the side adjacent the passage 8 a valve opening 16 provided with a valve seat formed by the edge 18 of the opening. A valve 20 guided by its stem 22 in a suitable spider 24 is arranged to rest with its conical edge on the seat 18. The valve 20 is normally held in closed position by a spring 26 resting, at one end, on the upper surface of the valve and, at the other end, against a spider 28 formed in a plate 30 which is held in place between the boss 10 and the adjacent wall of the casing. It is to be understood, however, that any other suitable type of valve, whatever its nature, might be utilized in place of the form shown.

Operating means is likewise provided for the valve. A shaft 32 is mounted to turn about the center of the casing about an axis extending longitudinally of the casing. The shaft is mounted in bearings 34 carried by spiders 36 rigid with the casing walls. The shaft carries a cam 38 which is adapted to engage the stem 22 of the valve, so that when the shaft is turned to one position the valve will be forced open against the action of the spring 26.

The shaft extends at each end to a position close to the open end walls of the casing. Each end of the shaft is provided with a coupling means. In the form of the invention shown, this is an externally splined or grooved section 40 on each end of the shaft adapted to cooperate with internally splined or grooved coupling members 42 for connection to other shafts.

Of course, any other suitable type of operating means might be provided.

A plurality of these units may be assembled in various manners. In the form of the invention shown in Fig. 5, for example, two of the units are arranged end to end. The holes 12 in the two adjacent units are aligned, and bolts 44 are passed through the aligned holes and secure the two casings together. The adjacent ends 40 of the shafts 32 are connected together by a coupling 42. Thus the two shafts turn in unison, although, of course, the cams may be arranged in any desired angular relation to each other. One of the casings, for example the left-hand casing in Fig. 5, has its open end closed by a plate 50 in which is mounted a shaft 52 which is coupled to the left-hand end 40 of the shaft 32 of the left-hand casing. The right-hand end of the shaft 32 of the right-hand casing is left free. The right-hand end of the right-hand casing is closed by a wall 54 provided with a passage or outlet 56.

The inlet openings 8 of the two casings are connected by a manifold 58 to a common pipe 60. Such an arrangement may be used, for example, where it is desired to have two valves feeding from the pipe 60 to the pipe 56. In such event, the cams 38 on the two shafts may be adjusted so as to obtain various rates of feed through one of the valves or through both simultaneously for any suitable purpose.

Fig. 6 shows a further arrangement for the use of valves embodying the invention. In this form, three of the casings are arranged in alignment. Between two of the casings there is provided a gasket 62 to seal communication therebetween. Between two other casings there is provided a bracket member 64 (see Fig. 7) having holes 66 through which the bolts 44 pass and other holes 68 by which it may be secured with bolts 70 to a fixed member 72. Thus the whole valve arrangement may be mounted without the provision of any special mounting connections on the valve units themselves.

The structure shown in Fig. 6 may be used, for example, to feed fluid from an inlet 56 to any one of a plurality of pipes 74. By suitably locating the cams 38 on the shafts 32, the pipes 74 may be supplied with fluid either individually or simultaneously.

Fig. 8 shows a further form of the invention in which the valve units are displaced with respect to each other so as to direct the passages and the bosses 10 in different directions. By the provision of equally spaced holes 12, this is easily possible. Of course, where four holes are provided, the outlets can be arranged at 90° to each other. However, this possible range of variation may be increased by the provision of additional sets of securing means.

While I have described herein some embodiments of my invention, I wish it to be understood that I do not intend to limit myself thereby, except within the scope of the appended claims.

I claim:

1. A valve unit of a manifold valve assembly comprising a casing with open ends of symmetrical shape about an axis normal to said open ends, said casing having a single fluid passage in a side wall thereof normal to the axis of said casing, and having a plurality of through-bolt holes formed in said casing extending parallel and symmetrically placed with respect to the axis of said casing, a camshaft extending coaxially within said casing, the length of the shaft being substantially equal to the axial length of said casing, a cam mounted on said camshaft, and a valve means adapted to be actuated by said cam to control the flow in said fluid passage.

2. A valve unit of a manifold valve assembly comprising a casing with open ends of symmetrical shape about an axis normal to said open ends, having a single fluid passage in a side wall thereof, means whereby a plurality of units may be assembled in end to end relationship with the fluid passage of each unit extending in the same or selected angular directions in relation to the said axis, a camshaft extending coaxially within said casing, the length of the shaft being substantially equal to the axial length of the casing, a cam mounted on the camshaft and a valve means adapted to be actuated by said cam to control the flow in the fluid passage.

3. A unitary valve comprising, a casing with open ends of symmetrical shape about an axis normal to said open ends, having a single fluid passage in a side wall thereof, a plurality of through-bolt holes formed in the casing extending parallel and symmetrically placed with respect to the axis of said casing, a camshaft extended coaxially within said casing, the length of said shaft being substantially equal to the axial length of said casing, a cam mounted on the camshaft and a valve means adapted to be actuated by said cam to control the flow in said fluid passage, closure walls for the open ends of said casing, one having formed therein a fluid passage, the other having mounted therein means for rotating the camshaft.

4. A manifold valve comprising, a plurality of unitary valve structures assembled between end closures by through-bolts, said unitary valve structures comprising casings having open ends of symmetrical shape about an axis normal to said open ends, each of said casings having a single fluid passage formed in one side thereof, through-bolt holes formed in said casing symmetrically placed with respect to the axis thereof so that the said fluid passage of each unit may extend in the same or selected angular positions in relation to the said axis, a cam and camshaft mounted coaxially within each casing, said camshafts substantially equal in length to the axial length of the unitary casing, valve means in said fluid passages actuated by said cams, an interengaging means for coupling the adjacent ends of the camshafts whereby the cams may be placed in a predetermined angular relationship, means formed in one end closure for actuating the camshafts together and a fluid pasasge formed in the other end enclosure.

5. A manifold valve comprising, a plurality of unitary valve structures assembled between end closures by through-bolts, said unitary valve structures comprising casings having open ends of symmetrical shape about an axis normal to said open ends, each of said casings having a single fluid passage formed in one side thereof, through-bolt holes formed in said casing symmetrically placed with respect to the axis thereof so that the said fluid passage of each unit may extend in the same or selected angular positions, a cam and camshaft mounted coaxially within each casing, valve means in said fluid passages actuated by said cams, an adjustable engaging means for coupling the adjacent ends of the camshafts whereby the cams may be placed in a predetermined angular relationship, means formed in one end closure for actuating the camshafts together and a fluid passage formed in the other end enclosure.

6. A manifold valve comprising, a plurality of unitary valve casings having open ends of symmetrical shape about an axis normal to the open ends arranged end to end, having a single fluid passage formed in a side wall of each casing, valve means in each fluid passage to control the flow therethrough, valve actuating means including camshafts extending coaxially within each casing substantially equal in length to the axial length of said casing, coupling means inter-engaging the adjacent ends of said cam shafts whereby all the camshafts are actuated together.

7. A manifold valve comprising, a plurality of unitary valve casings having open ends of symmetrical shape about an axis normal to the open ends arranged end to end, having a single fluid passage in a side wall of each casing, valve means in each fluid passage to control the flow therethrough, valve actuating means including camshafts extending coaxially within each casing substantially equal in length to the axial length of said casing, coupling means inter-engaging the adjacent ends of said cam shafts whereby all the camshafts are actuated together, said shaft coupling means including an internally splined sleeve to engage external splines on said cam shafts whereby the angular relationship of the camshafts may be set to operate said valves in a predetermined sequence.

8. A manifold valve comprising, a plurality of unitary valve structures assembled between end closures, said unitary valve structures comprising casings having open ends of symmetrical shape about an axis normal to said open ends, each of said casings having a single fluid passage formed in one side thereof, means whereby a plurality of units may be assembled in end to end relationship with the fluid passage of each unit extending in the same or selected angular positions in relation to the said axis, a cam and cam shaft mounted coaxially within said casing, said camshaft substantially equal in length to the axial length of the unitary casing, valve means in said fluid passages actuated by said cams, an adjustable removable coupling means for the adjacent ends of the cam shafts whereby the cams may be placed in a predetermined angular relationship, means formed in one end closure for actuating the camshafts together and a fluid passage formed in the other end closure.

LESLIE T. MILLER.